(No Model.) 2 Sheets—Sheet 1.

M. C. McMILLAN.
CHECK ROW ATTACHMENT.

No. 498,292. Patented May 30, 1893.

WITNESSES:
H. M. Plaisted.
Fred Ernest.

INVENTOR
Moses C. McMillan,
BY H. A. Goulwin,
HIS ATTORNEY.

(No Model.) 2 Sheets—Sheet 2.
M. C. McMILLAN.
CHECK ROW ATTACHMENT.
No. 498,292. Patented May 30, 1893.
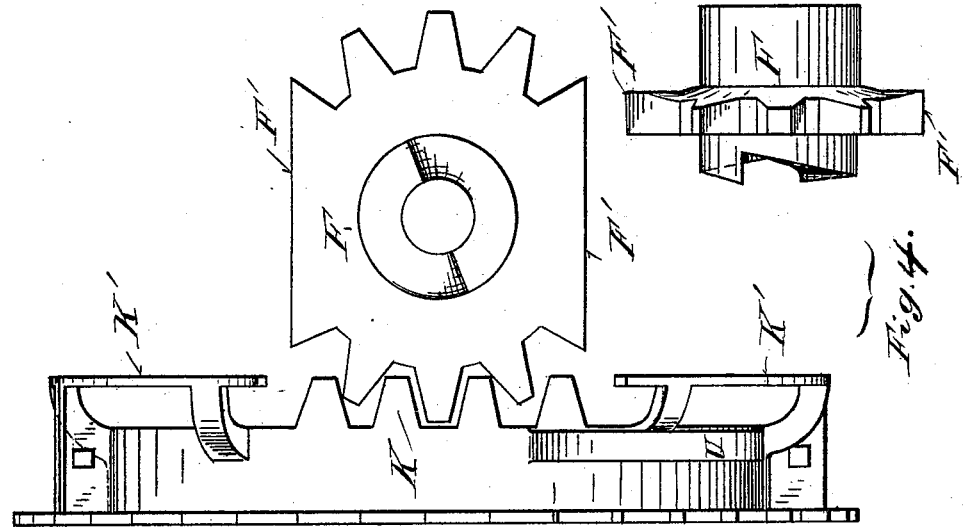
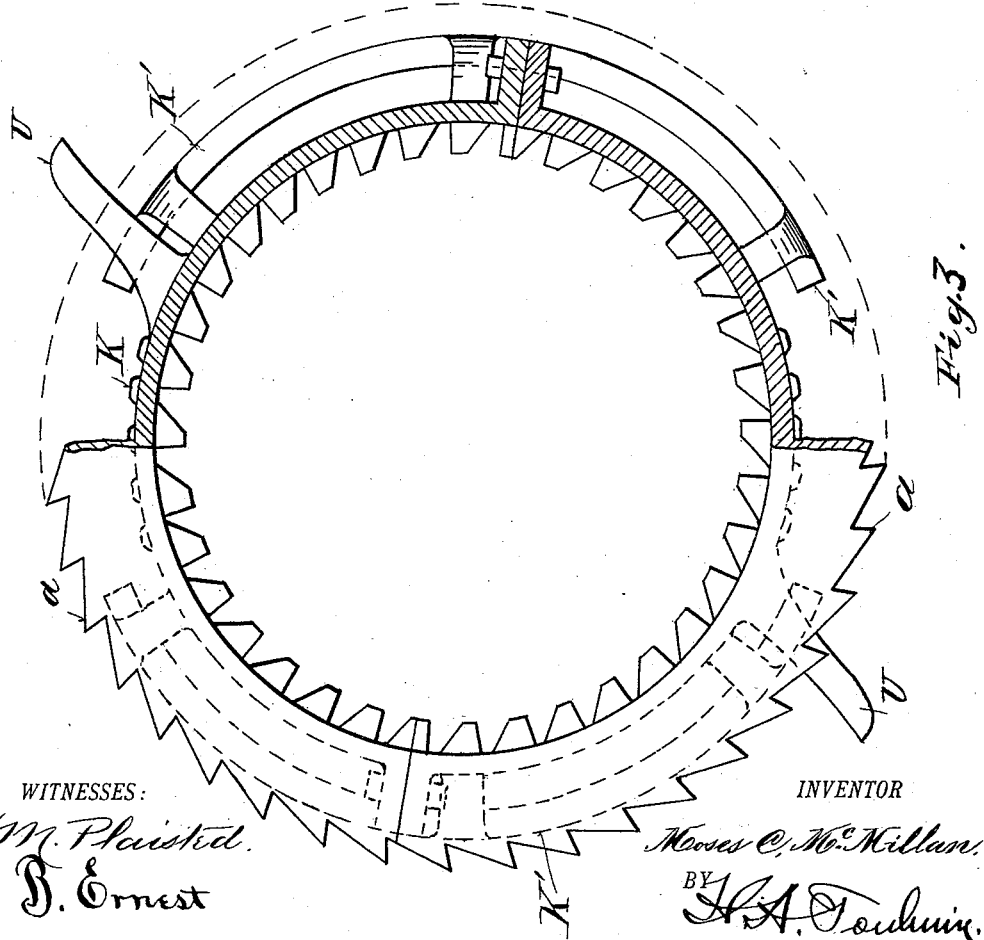
WITNESSES:
H. M. Plaisted.
F. B. Ernest
INVENTOR
Moses C. McMillan.
BY H. A. Toulmin.
HIS ATTORNEY.

United States Patent Office.

MOSES C. McMILLAN, OF GURNEYVILLE, OHIO.

CHECK-ROW ATTACHMENT.

SPECIFICATION forming part of Letters Patent No. 498,292, dated May 30, 1893.

Application filed October 24, 1892. Serial No. 449,800. (No model.)

*To all whom it may concern:*

Be it known that I, MOSES C. MCMILLAN, a citizen of the United States, residing at Gurneyville, in the county of Clinton and State of Ohio, have invented certain new and useful Improvements in Check-Row Attachments, of which the following is a specification, reference being had therein to the accompanying drawings.

My invention relates to certain new and useful improvements in check row attachments, being especially adapted to the invention set forth in my application, Serial No. 429,540, filed April 18, 1892.

The principal feature of my improvements is the means for operating the sliding ring described in said application above, by means of a foot operated hook, together with a special form of pinion and clutch connections therewith for operating the feed mechanism; have reference also to a hoe or scraper device for use as a marker; also to release attachments for disengaging the said feed and marking mechanism from their operating gearing.

Other points and peculiarities and advantages will be pointed out hereinafter and claimed.

Figure 1:
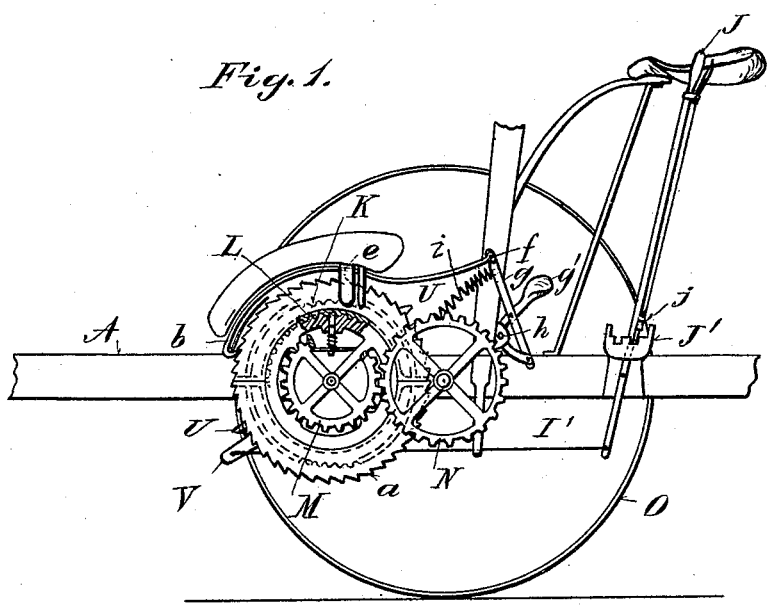
Figure 2:
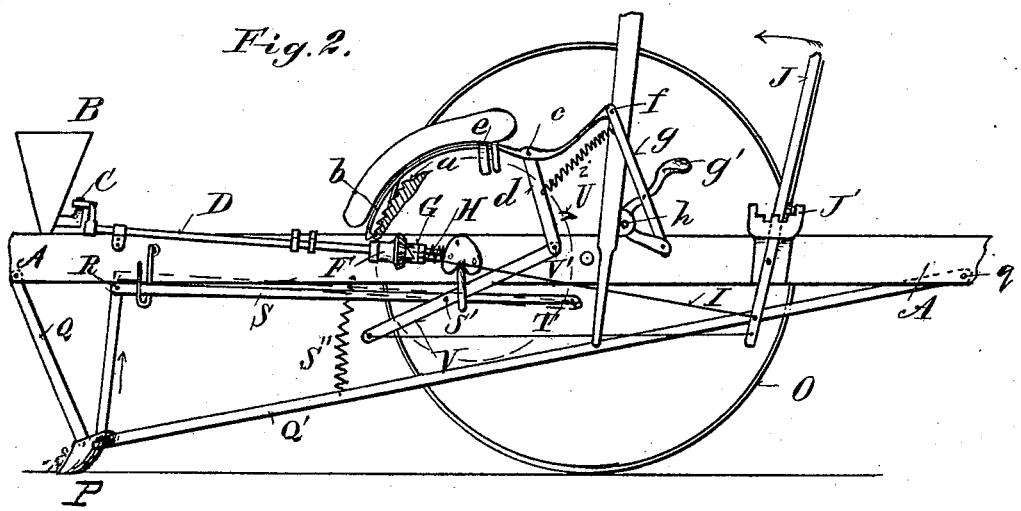

In the accompanying drawings on which like reference letters indicate corresponding parts, Figure 1, represents a side view of a corn planter or other machine adapted to the use of my device, portions being broken away to show the construction, and the side supporting wheel removed; Fig. 2, a similar side view with the gear-ring and driving parts removed, to show the clutch pinion and the release mechanism for the feed and scraper; Fig. 3, a plan view of one side of the machine; and Fig. 4, detailed views enlarged, of the sliding gear-ring, and clutch pinion therefor.

In my application above named, I show and describe a sliding ring which was adjusted by reaching down from the driver's seat and sliding it by hand, when it was desired to regulate the marking mechanism as therein described. I show in the present application a foot-operated catch, and a modification and improvement on said sliding ring which I will presently describe.

The letter A designates a carrying frame of a corn planter or other suitable machine, provided with any convenient form of feeding attachment B, operated by a rod C, connected to a crank shaft D, having a clutch pinion F, loosely mounted thereon, the clutch face of which is adapted to be engaged by a sliding clutch-collar G, feather keyed to the shaft D and kept in engagement with said pinion by a spring H, or otherwise. A rod or other connection I attached to a trip lever J, draws back said clutch collar G, when the lever is operated and thrown forward. This action frees the clutch pinion so that it may revolve loosely on the shaft D, under the action of the driving gear-ring K, with which it meshes. As previously described in the application above referred to, this ring K is slidingly mounted on a wheel center L, having a ratchet connection with said ring as indicated in Fig. 1, and provided with a spur-gear M, meshing with a driving gear N, driven by the motion of the carrying wheel O upon the ground.

The marking device, in this application, consists of a scraper P, stayed and braced by connections Q with the frame, and pivoted at R to a lever S, fulcrumed at S', having at the other end a projection T, engaged by one or more teeth U on the sliding ring, which thus throw the scraper upward in the direction of the arrow, and leave a hill of dirt to mark the row. The scraper normally engages with the ground and collects a quantity of dirt which is left in a hill when the scraper is raised. The fulcrum S', of the lever, is on a swinging bar V, pivoted to the frame at V' and having a connection at the other end to the said trip-lever J. The same motion of the trip-lever J, which releases the clutch pinion, also throws the finger T away from the operating hook U on the sliding ring, and releases the marking attachment. The feeding and the marking mechanism both cease operation when the trip lever is actuated. The trip lever is held in the toothed segment or bracket J' by the usual catch *j*, as shown.

To rotate the sliding ring I provide thereon a ratchet rim *a*, Figs. 1, 3 and 4, the teeth of which are engaged by a catch *b*, Figs. 1 and 2, pivoted at *c*, to a swinging piece *d* which supports the catch in proper position with the help of guide pieces *e*. The end of the catch is connected at *f* with a bell-crank lever g operated by the other end g' constituting the foot rest, about the pivot fulcrum h as shown in Figs. 1 and 2. A spring i connects the supporting piece d and said lever g to throw the catch forward again after being operated by the foot. The spring i may be otherwise connected to effect the same result. Referring to Figs. 3 and 4, I have shown a clutch pinion F rotated by the gear segments K of the ring, to operate the crank shaft D of the feed mechanism at suitable intervals, which pinion is provided with fingers in its circumference and sliding portions F, which slide along matching bearing portions K, and thereby maintain the pinion and connected feed mechanism at rest while the ring is turning between the teeth segments. In my former application I provided a locking catch which is now done away with.

Two teeth U are shown on the sliding ring, and two segments with intervening sliding bearing portions for the clutch pinion are also shown. This is the preferred form of construction. I do not limit myself to the exact form and construction herein shown and described. Thus it will be seen that the feed mechanism and the marking scraper can be thrown out, the sliding ring adjusted by the foot of the driver, and the machine has been improved and simplified over the form set forth in my application above referred to.

Referring to Fig. 2, a push rod Q' is connected at one end to the frame by a fragile connection, such as a wooden pin q, while the other end is engaged with or adjacent to the shovel or scraper in order to brace it against the ground. In case the scraper strikes a snag, however, the wooden pin or other fragile connection, will break and relieve the strain and save the shovel from damage. Thus the piece Q supports the shovel and swings it about one end, while the push rod Q' braces it against the ground. A spring S" assists in supporting the pressure rod, being connected to the frame as shown, and in fact aids the raising of the scraper as the trip and lever mechanism operates the same at suitable intervals.

While I have spoken of a sliding rim, the term is intended to include any ring annulus or wheel, to be used as and for the purpose hereinbefore described.

Having thus fully described my improvements, what I claim as new, and desire to secure by Letters Patent, is—

1. The combination with a supporting frame and feeding mechanism carried thereby, of a wheel center, a sliding rim or wheel loosely mounted thereon, and having ratchet teeth, a movable catch for said ratchet teeth to rotate said rim on the wheel center, and a ratchet connection between said wheel center and said rim, to allow the rotation of the rim and center independently of each other in one direction, and effect simultaneous rotation in the other direction.

2. The combination with a wheel center, of a rim or annulus slidingly mounted thereon, a ratchet connection between said center and rim, a hook catch adapted to engage with ratchet teeth on the outer surface of said rim to rotate the latter on the said wheel center, and means to operate said hook catch.

3. The combination with a wheel center, of a rim or annulus rotatably mounted thereon, a ratchet connection between the two members, the said rim being provided with ratchet teeth on its periphery, a hook catch adapted to engage with said ratchet teeth, a swinging piece pivoted to said catch, to support the same adjacent to the said rim, and a treadle acting on said catch to effect said rotation of the rim on the said center.

4. In a corn planter, the combination with a wheel center as a support, and a gear wheel carried thereby, of a driving gear meshing with said gear, and operated by the rotation of the carrying wheels on the ground, of a sliding ring or annulus mounted on said wheel center and having gear segments and sliding bearing faces, a ratchet connection between said wheel center and ring, a pinion having segments matching the ring segments and corresponding sliding faces matching those on the ring, a shaft for said pinion, a feed mechanism and operative connections between said mechanism and said shaft, a clutch slidingly mounted on said shaft and adapted to engage said pinion, a marking mechanism, a trip lever, and interconnections between said lever and said marking mechanism and said clutch respectively, whereby the disengagement of the feeding and the marking mechanism may be effected.

5. In a corn planter, the combination with carrying wheels for the frame, and a driving gear wheel rotated thereby, of a spur gear meshing with the said driving gear and provided with a wheel center, a ring having interior teeth and rotatably mounted on said wheel center, a ratchet connection engaging with said teeth, the ring having outside ratchet teeth, a hook catch therefor and a treadle mechanism engaging with said hook catch, whereby the rotation of the sliding ring may be effected by the foot of the driver.

6. In a corn planter, the combination with a carrying frame, feeding mechanism and a pinion shaft operatively connected to said feed mechanism, of a ring or wheel having gear segments, a shaft, a bevel pinion loosely mounted thereon, and having a clutch face, a clutch slidingly mounted on said shaft and adapted to engage with said pinion, means to operate said pinion, a marking mechanism consisting of a scraper adapted to leave a hill of dirt, means to operate said scraper, a trip lever and stop-catch, and connections between said lever and the said marking scraper and clutch respectively, whereby both feeding and marking mechanisms are thrown out of action by operating said trip lever.

7. In a corn planter, the herein described marking attachment, the same consisting of a scraper, a lever supporting said scraper at one end and having a trip finger at the other end, a sliding ring having operating teeth for said finger, and a wheel center for said ring, a swinging bar to which said lever is fulcrumed, one end of the bar being pivoted to the frame, a trip catch lever, and a connection from said trip lever to the other end of said bar, whereby the said finger may be thrown out of the path of the operating tooth.

8. In a corn planter, the combination with a carrying frame, feeding and marking mechanism thereon, the latter consisting of a scraper normally engaging with the ground, a lever supporting said scraper at one end, and having a projection at the other end, a toothed ring adapted to engage with said finger projection and raise the scraper at intervals, a wheel center on which said ring or wheel is rotatably mounted, a ratchet connection between said center and ring, a hook catch adapted to engage with ratchet teeth on the outside of said ring, a swinging piece supporting said catch, a bell-crank lever engaging with the end of said catch beyond its support, and constituting a treadle to bring it in engagement with said ratchet teeth and rotate the ring, a spring to return said treadle and catch, means to operate said feed mechanism, and a trip lever engaging with said feed-operating means and marking attachment to throw the same out of action before the rotation of said ring.

9. In a corn planter, the combination with a carrying frame, of a scraper or shovel hung thereto, a push bar adapted to brace said scraper from the frame to the ground, a fragile connection between said push bar and frame whereby the brace will give under undue strain on the scraper, and a lever trip mechanism to raise said scraper at intervals.

In testimony whereof I affix my signature in presence of two witnesses.

MOSES C. McMILLAN.

Witnesses:
E. B. HOWLAND,
FRANK B. MILLS.